(12) United States Patent
Austin et al.

(10) Patent No.: US 6,186,670 B1
(45) Date of Patent: Feb. 13, 2001

(54) OPTICAL FIBER CONNECTOR MODULE

(75) Inventors: David Austin, Lexington, SC (US); Dan Calanni, Plano, TX (US)

(73) Assignee: Pirelli Cable Corporation, Lexington, SC (US)

( * ) Notice: Under 35 U.S.C. 154(b), the term of this patent shall be extended for 0 days.

(21) Appl. No.: 09/089,021

(22) Filed: Jun. 2, 1998

(51) Int. Cl.[7] .................................................. G02B 6/38
(52) U.S. Cl. ............................. 385/55; 385/60; 385/72; 385/78; 385/92
(58) Field of Search .................................. 385/53, 55, 56, 385/58–60, 70–72, 76–78, 88, 89, 92–94

(56) References Cited

U.S. PATENT DOCUMENTS

| | | | |
|---|---|---|---|
| 4,387,956 | | 6/1983 | Cline ...................................... 385/136 |
| 4,611,887 | | 9/1986 | Glover et al. ........................... 385/71 |
| 4,944,568 | | 7/1990 | Danbach et al. ........................ 385/88 |
| 5,124,506 | | 6/1992 | Briggs et al. ............................ 174/67 |
| 5,363,460 | * | 11/1994 | Marazzi et al. ......................... 385/70 |
| 5,664,955 | | 9/1997 | Arnett ..................................... 439/135 |
| 5,708,745 | * | 1/1998 | Yamaji et al. .......................... 385/92 |
| 5,721,799 | * | 2/1998 | Fentress .................................. 385/77 |
| 5,757,997 | * | 5/1998 | Birrell et al. ........................... 385/60 |
| 5,883,995 | * | 3/1999 | Lu ........................................... 385/60 |
| 5,909,526 | * | 6/1999 | Roth et al. .............................. 385/78 |
| 5,915,058 | * | 6/1999 | Clairardin et al. ...................... 385/77 |
| 5,956,444 | * | 9/1999 | Duda et al. ............................. 385/53 |
| 5,984,531 | * | 11/1999 | Lu ........................................... 385/60 |
| 6,081,647 | * | 6/2000 | Roth et al. .......................... 385/60 X |

FOREIGN PATENT DOCUMENTS

0697607A1  2/1996  (EP) ................................ G02B/6/38

OTHER PUBLICATIONS

Patent Abstracts of Japan—Publication No. 62153807 Toshiba Corp. (Dec. 1985).

* cited by examiner

*Primary Examiner*—John D. Lee
(74) *Attorney, Agent, or Firm*—Norris, Mc Laughlin and Marcus; L. P. Brooks (57) ABSTRACT

An optical fiber connector module for mating optical fiber connectors includes a covering which avoids particles, dust or debris from accumulating on the end face of a fiber connector installed in the module when the installed fiber connector is not mated to another fiber connector using an optical fiber adapter. The module also allows ease of cleaning of the end face of the fiber of the unmated, installed fiber connector without removal of the module from a panel of optical instrumentation equipment to which the module has been mounted. A locking flange on the module facilitates mounting of the module to the equipment.

23 Claims, 10 Drawing Sheets

OPTICAL FIBER CONNECTOR MODULE

FIELD OF THE INVENTION

The present invention relates to optical fiber connector assemblies, and more particularly, to an optical fiber connector module which can retain an optical fiber connector, eases cleaning of and protects the end face of the optical fiber of the retained connector and can receive and engage an optical adapter to provide for mating of the retained connector with another fiber connector.

BACKGROUND OF THE INVENTION

Optical fiber interconnection links usually include a pair of optical fiber connectors that are mated by installation on an optical fiber adapter. For example, a fiber connector can be snapped or screwed into the adapter so that the connector mates with another connector which can also be snapped or screwed into the adapter. The adapter is constructed to mate respective connectors which are installed on the adapter in precise registered alignment, such that the end faces of the fibers of the respective connectors face each other, are coaxial and are in precisely spaced relationship, to ensure relatively lossless optical energy transfer between the fibers.

It is well known that the optical signal transmission level and quality between optical fibers of mated fiber connectors can become degraded if microscopic particles, dust or debris, which may be present in the air to which the connectors are exposed, accumulates on the end face of an optical fiber of one of the connectors and the end face is not cleaned before the connector holding such fiber is mated with the fiber connector holding the other optical fiber to form an optical fiber interconnection link. Therefore, it is common practice to clean the exposed end face of the fiber in each of the connectors to be mated before the connectors are installed on an adapter.

Currently known optical fiber adapters, however, do not protect the end face of the fiber of a connector which has been installed on the adapter from accumulating microscopic particles, dust or debris when only that connector is installed on the adapter. Oftentimes, a fiber connector which has been mated to another fiber connector using an optical adapter will be removed from the adapter and the connector that remains installed on the adapter will not be immediately mated with another fiber connector. The end face of the fiber of the connector remaining installed on the adapter in this circumstance is, therefore, unprotected. If particles, dust or debris which may be present in the air to which the remaining connector is exposed accumulates on the end face of the fiber, optical signal transmission between the fiber of the remaining connector and a fiber of another connector to which the remaining connector is subsequently mated can be adversely affected.

Although the end face of a fiber of a single connector that has been installed on an adapter, but is not mated to another connector, can be cleaned, for example, by inserting a thin swab into the area of the adapter which is unoccupied, because only the single connector is installed thereon, and by wiping the end face of the fiber with the swab, such a procedure can be time consuming, tedious, painstaking and ineffective. It has been found that the end face of the fiber of the single, unmated connector which has been installed on the adapter can become so dirty that cleaning by wiping the end face of the fiber with a swab or a wipe is ineffective. In such circumstances, the connector must be removed from the adapter, or the adapter including the connector must be removed from the front panel or backplane of optical instrumentation equipment to which the adapter typically has been mounted by screws and then further disassembled, to allow for proper cleaning of the end face of the fiber of the connector. It is well known, however, that after an optical adapter is mounted to the panel of optical instrumentation equipment, the adapter is not easily removed from the equipment because of the construction of the equipment or because obstructions near or surrounding the equipment can make removal of the adapter cumbersome, difficult and time consuming.

Therefore, there is a need for an optical fiber connector assembly which allows for ease of and adequate cleaning of the end face of an optical fiber of a connector which has been installed in the assembly without removing the assembly from equipment to which it has been mounted or without disassembling part of or the entire assembly or removing the connector from the assembly; which protects against the accumulation of particles, dust or debris on the end face of the fiber of a connector which has been installed in the assembly while the connector is not mated to another connector; and which can receive an optical adapter to provide for precise registered mating within the assembly between a connector installed in the assembly and another fiber connector, where each of the connectors can be selected from a plurality of fiber connector styles.

SUMMARY OF THE INVENTION

In accordance with the present invention, an optical fiber connector module is constructed to retain an optical fiber connector, to receive and engage an optical adapter which provides for precise registered mating of the end face of the fiber of the connector which the module can retain and the end face of a fiber of another optical fiber connector which is installed on the adapter and to provide that, upon removal of the adapter from the module with the another fiber connector, the end face of the fiber of the connector which has been retained in the module is easily cleaned and protected against the accumulation of particles, dust or debris thereon.

In a preferred embodiment, the optical fiber connector module includes a cover which, when an optical adapter is not received and engaged within the module, can be disposed in a closed position to protect against the accumulation of particles, dust or debris on the end face of a fiber of a connector which the module can retain. The cover also can be disposed in a plurality of open positions to allow for ease of cleaning of the end face of the fiber of a retained connector and installation of an optical adapter within the module to allow for mating of another fiber connector to the retained connector. In a preferred embodiment, the cover includes a locking feature that can be engaged with the optical adapter to retain the adapter securely in the module.

In one of the preferred embodiments, the module includes a rotatable door which constitutes a cover that can be rotated to the closed position and to the plurality of open positions about a pivot pin which couples the door to the module.

In a further embodiment, the module includes a locking flange that provides ease of mounting of the module in a cutout of a panel of optical instrumentation equipment.

BRIEF DESCRIPTION OF THE DRAWINGS

Other objects and advantages of the present invention will be apparent from the following detailed description of the presently preferred embodiments, which description should be considered in conjunction with the accompanying drawings in which.

DETAILED DESCRIPTION OF PREFERRED EMBODIMENTS

The invention is illustrated below in connection with an optical fiber connector module constructed to retain an SC style fiber connector, to receive and engage an FC-SC style optical adapter on which an FC style fiber connector has been installed to provide that the SC and FC connectors are mated and, when the optical adapter with the FC connector is not within the module, to allow for ease of cleaning of and to avoid the accumulation of particles, dust or debris on the end face of the fiber of the SC connector retained in the module. It is to be understood, however, that the inventive module can be constructed in accordance with the present invention to retain other styles of optical fiber connectors and to receive and engage an optical adapter suitably constructed for mating such retained connectors to other styles of optical fiber connectors.

Figure 1:
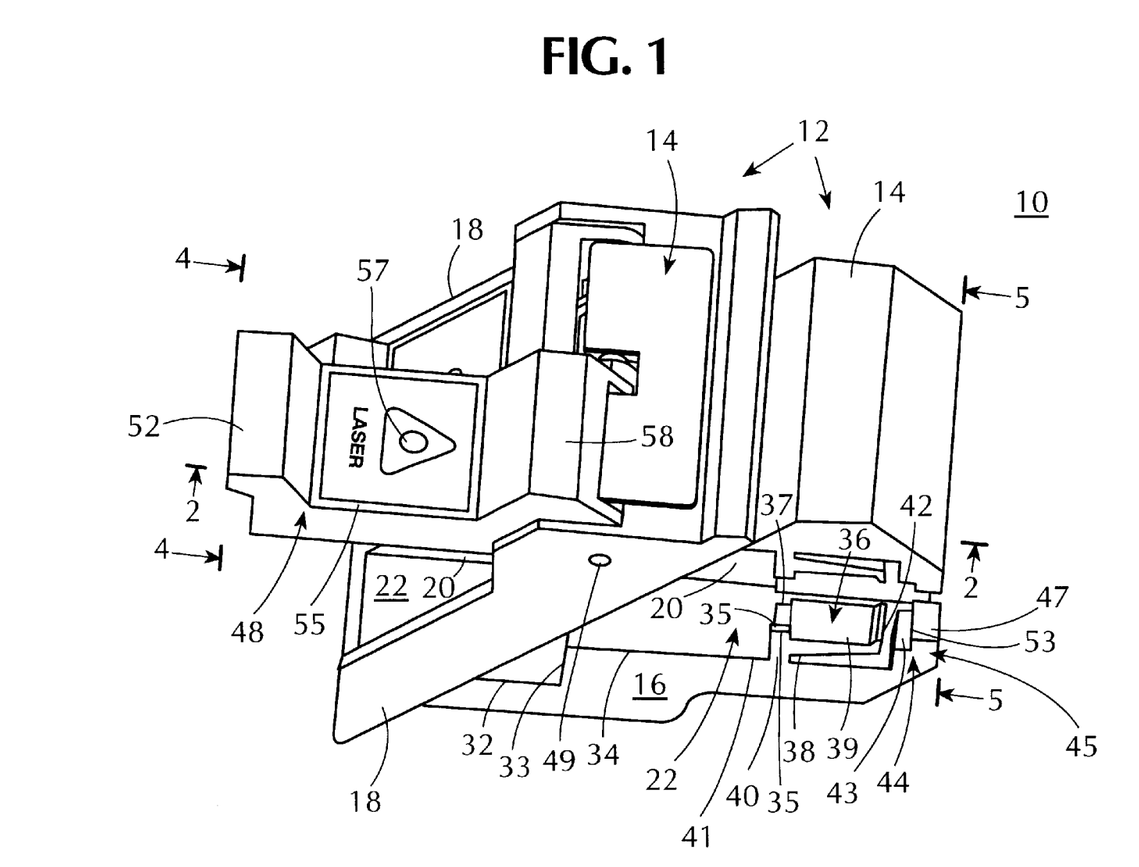
FIG. 1 is a side elevation, perspective view of the optical fiber connector module of the present invention.

FIG. 1 illustrates a preferred embodiment of an optical fiber connector module 10, in accordance with the present invention, shown in perspective, side elevational view. Referring to FIG. 1, the module 10 comprises a housing 12 having a top wall 14, a bottom wall 16 which opposes the top wall 14 and two side walls 18. The side walls 18 are parallel to each other and perpendicular to the bottom wall 16 and extend between respective opposing ends of the top wall 14 and the bottom wall 16. A center dividing wall 20 extends from the top wall 14 to the bottom wall 16, is parallel to the side walls 18 and is disposed between and equidistant from the side walls 18 to divide the module 10 symmetrically into two identical chambers 22.

For clarity and ease of reference, the module 10 is described in detail below only with respect to one of the chambers 22. In the illustrated exemplary embodiment of the module 10, each of the chambers 22 is constructed to retain an SC style fiber connector and to receive and engage within the module 10 an FC-SC style optical adapter on which an FC style fiber connector has been installed to form an optical intercommunication link between the fiber of the SC connector and the fiber of the FC connector. It is to be understood, however, that in an alternative preferred embodiment, each of the chambers 22 can be constructed to retain a different type of fiber connector and to receive and engage a suitable optical adapter on which a desired connector has been installed to provide that the retained connector is mated to the desired connector. The connector styles can include SC, FC, PC and ST or other styles that become standard.

The module 10 can be constructed to receive any style optical adapter and retain any style connector by suitably selecting the structure and dimensions of the top wall, the bottom wall and the side walls of the housing 12 to provide that, upon installation of the adapter within the module for mating the desired style connectors, the faces of the fiber in the connector retained by the module and the fiber of the other connector installed on the adapter are in precise registered coaxial alignment.

Figure 2:
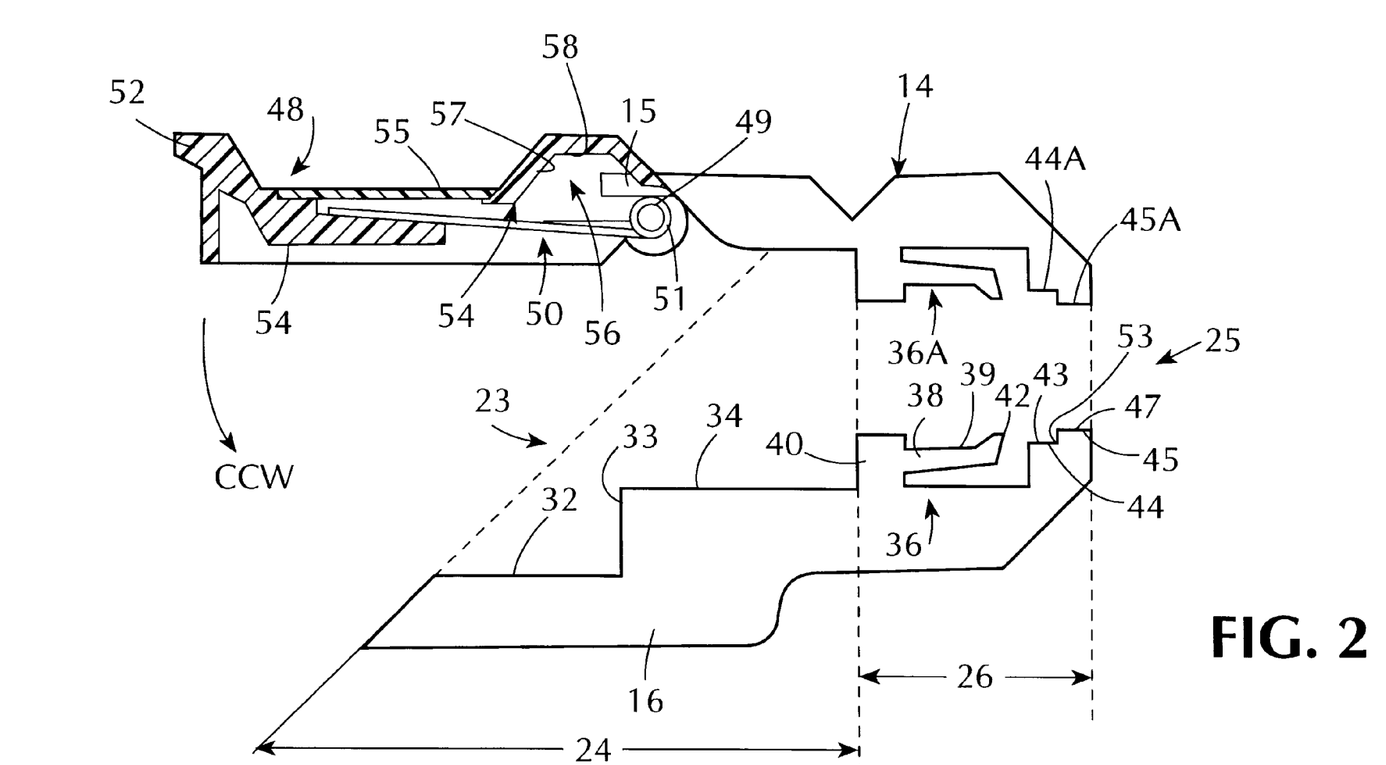
FIG. 2 is an end sectional view of the module of FIG. 1 as viewed in the direction of the arrows 2—2 indicated in FIG. 1.
Figure 3:
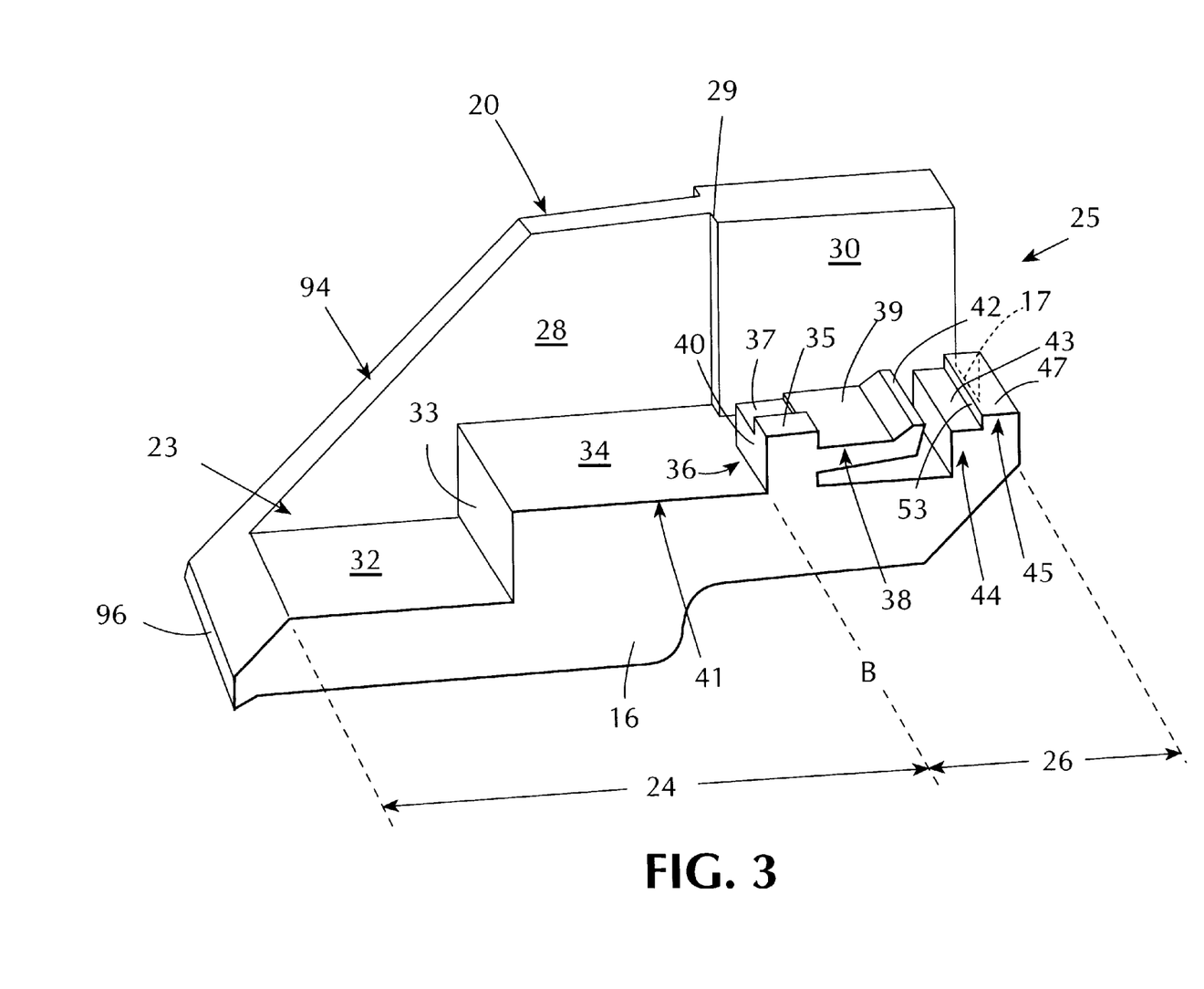
FIG. 3 is a side elevation, perspective view of one of the chambers of the module of FIG.1 with the top wall, door and side wall omitted.

Referring to FIG. 1 and FIG. 2, which shows an end sectional view of the module 10 with the side wall 18 and the center wall 20 omitted, and FIG. 3, which shows an elevational perspective view of one of the chambers 22 of the module 10 with the top wall 14, the side wall 18 and a door 48, which is described in detail below, omitted, the chamber 22 extends lengthwise through the housing 12 from a front opening 23 to a back opening 25. The chamber 22 is formed from a front chamber 24 which extends from the front opening 23 towards the back opening 25. The front chamber 24 connects with a back chamber 26 which adjoins the front chamber 24 and extends to the back opening 25.

The dividing wall 20 includes a front surface 28 which extends from the front opening 23 to an adjoining stepped back surface 30, which is also a part of the wall 20. The back surface 30 projects further towards the opposing side wall 18 than the front surface 28. A step surface 29 which faces the front opening 23 extends from the front surface 28 to the back surface 30 and is perpendicular to the front and back surfaces 28 and 30. A plane perpendicular to the surfaces 28 and 30 and including the step surface 29 defines the division or boundary, B, between the front chamber 24 and the back chamber 26 of the chamber 22.

The bottom wall 16 includes a front surface 32 which extends from the front opening 23 to an adjoining stepped back surface 34, which is also a part of the bottom wall 16. The surface 34 projects further towards the top wall 14 of the housing 12 than the front surface 32. A step surface 33 which faces the front opening 23 extends between the front and back surfaces 32 and 34 and is perpendicular to the front and back surfaces 32 and 34. The back surface 34 extends lengthwise in the module 10 from the surface 33 within the front chamber 24, through the back chamber 26 and to a back edge 17 of the bottom wall 16 at the back opening 25.

The back chamber 26 includes an SC fiber connector retaining mechanism 36 which is, preferably, integral with the bottom wall 16. The retaining mechanism 36 extends towards the back opening 25 from the boundary B and includes a post 40, a clip 38 and a tooth 42. The clip 38 extends in part from the boundary B and in part from the post 40 towards the back opening 25, above the bottom surface 34, and terminates at the tooth 42. The tooth 42 curls away from the clip 38 and towards the top wall 14. The post 40 has a flat top surface 35. The clip 38 includes a flat top surface 37 which extends from the post 40 towards the wall surface 30 and a flat surface 39 which extends from side edge 41 of the bottom wall 16 towards the surface 30. The surfaces 37, 39 and 35 are parallel to the bottom wall surface 34. The former of the surfaces 35 and 37 and of the surfaces 39 and 37, respectively, projects further towards the top wall 14 than the latter.

Stepped projections or stops 44 and 45, which are integral with the bottom wall 16, are disposed in the back chamber 26 adjacent to each other, proximate to the back opening 25 and spaced from the retaining mechanism 36. The stops 44 and 45 have top surfaces 43 and 47, respectively, which are flat and parallel to the surface 34. A step surface 53 which faces the front opening 23 extends between the top surfaces 43 and 47 and is perpendicular to the front and back surfaces 32 and 34. The stop 45 terminates at the back edge 17 of the bottom wall 16.

The retaining mechanism 36 and the stops 44 and 45 extend equally transversely across the back chamber 36 from the side edge 41 of the bottom wall 16 towards the center wall surface 30, but do not contact the center wall surface 30, to define an unoccupied lengthwise portion in the back chamber 26 which extends between the boundary B and the back opening 25.

The top wall 14 includes an integral retaining mechanism 36A and stops 44A and 45A which are identical to the retaining mechanism 36 and the stops 44 and 45, respectively. The retaining mechanism 36A and the stops 44A and 45A project from the top wall 14 towards the bottom wall 16 in direct opposition to the retaining mechanism 36 and the stops 44 and 45 to define a region in the back chamber 26 of the module 10 which can retain an SC style fiber connector.

In a preferred embodiment, the retaining mechanisms 36, 36A, the stops 44, 44A, 45, 45A and all of the top, bottom, side and center dividing walls 14, 16, 18, 20 of the housing 12 are integral and formed by injection molding. In the illustrated embodiment, the housing 12 has been manufactured by injection molding using a plastic material to provide that the retaining mechanisms 36, 36A and the stops 44, 44A, 45, 45A of the back chamber 26 can retain a conventional SC fiber connector and that a conventional FC-SC optical adapter can be received and engaged within the module 10 in the front chamber 24 to provide that the SC connector, which has been installed in and is retained by the module 10, can be mated with an FC fiber connector that is installed on the other end of the optical adapter.

In an alternative embodiment, the retaining mechanisms 36 and 36A are not integral with the housing 12 and, instead, comprise a conventional locking or retaining device, such as a sheet metal clip, each of which is coupled to the bottom and top walls 14 and 16 in the back chamber 26 to provide that a fiber connector can be retained within the module 10.

Figure 4:
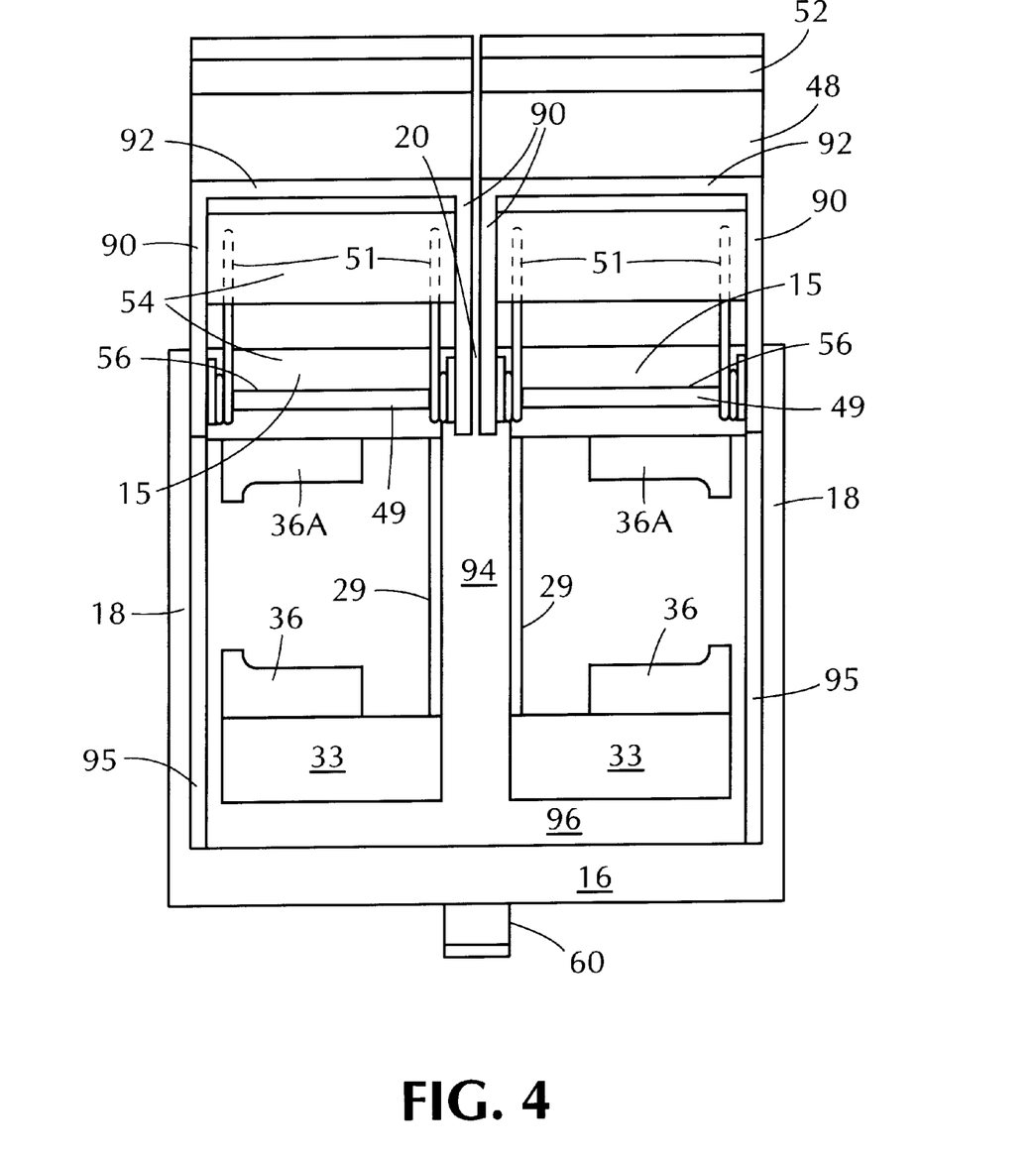
FIG. 4 is a front view of the module of FIG. 1 with both doors in an open position as viewed in the direction of the arrows 4—4 indicated in FIG. 1.
Figure 5:
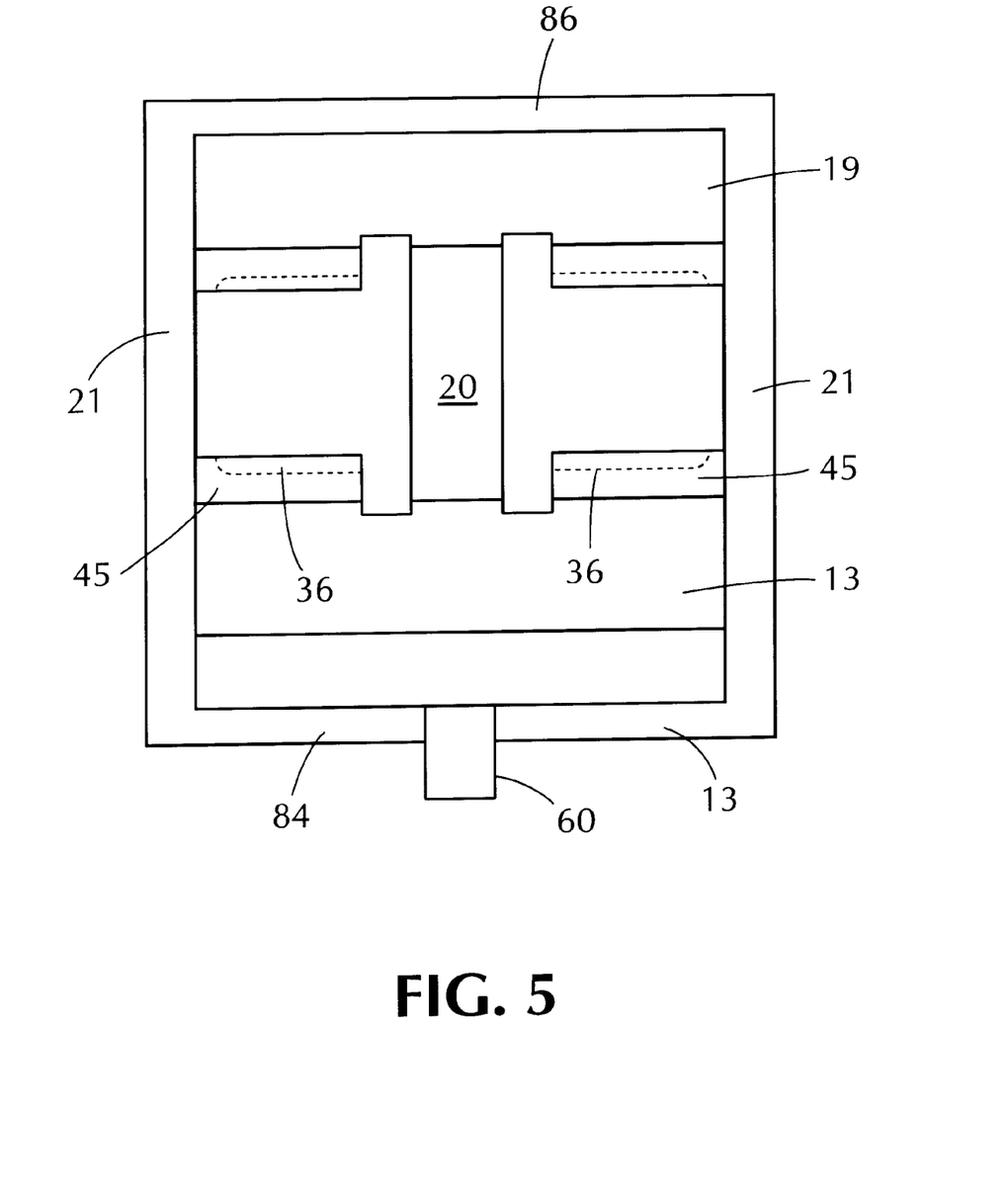
FIG. 5 is a back view of the module of FIG. 1 with both doors in an open position as viewed in the direction of the arrows 5—5 indicated in FIG. 1.

Referring to FIGS. 1 and 2, a covering or door 48, which is independent and separate from the housing 12, is pivotally mounted at the front opening 23 on a pivot pin 49 which is coupled to the side walls 18. FIGS. 4 and 5 show front and back views of the module 10, respectively, with both of the doors 48 in an open position, which is defined in detail below. The pin 49 extends between the two side walls 18, through the center wall 20, and beneath front lip 15 of the top wall 14. The door 48 includes an underside 54 having a locking recess 56 which is adjacent to the portion of the door 48 coupled to the pin 49. The locking recess 56 constitutes a recessed or notched portion in the underside 54 of the door 48 and is defined by an inclined surface 57 and a surface 58 which is adjacent to the inclined surface 57. The surfaces 57 and 58 extend transversely to the longitudinal length of the door 48.

The door 48 further includes a spring system 50 which biases or urges the door 48 to rotate on the pin 49 in a counterclockwise direction, as indicated by the arrow CCW in FIG. 2. The spring system 50 includes a spring coil 51 which is wound several times around the pin 49 and fixed to the underside 54 of the door 48. It is to be understood that the spring system 50 can constitute any conventional component which can couple the door 48 to the pin 49 and urge the door 48 to rotate on the pin 49 in the direction CCW. The spring system 50 further provides that the door 48 can be rotated lockwise on the pin 49, as desired by a user, without the exertion of a substantial force.

The door 48 also includes a user engageable bent lever 52 at the end of the door 48 opposing the end coupled to the pin 49. The lever 52 extends away from the door 48 and is easily grasped by a user to allow for manual rotation of the door 48 on the pin 49.

Referring in particular to FIG. 4, the door 48 includes opposing side bottom surfaces 90 and a front bottom surface 92, all of which are in the same plane. Further, the center wall 20 includes a front edge surface 94, the side wall 18 includes a front edge surface 95 and the bottom wall 16 includes a front edge surface 96. The surfaces 94, 95 and 96 are also all in the same plane.

The door 48 can be rotated on the pin 49 in a plane parallel to the side walls 18 to a closed position and to a plurality of open positions. In the closed position, the opposing surfaces 90 and the surface 92 of the door 48 are parallel to, face and contact, respectively, the surfaces 94, 95 and 96 of the housing 12. Thus, in the closed position, the door 48 substantially seals the front opening 23 of the chamber 22 to prevent microscopic particles, dust or debris, which may be present in the air at the front opening 23, from entering the chamber 22 of the module 10 through the front opening 23. In the open positions of the door 48, the door 48 is relatively rotated on the pin 49 clockwise from the closed position so that the surfaces 90 and 92 are spaced from and do not contact the edge surfaces 94, 95 and 96, respectively, of the housing 12. In any of the open positions of the door 48, dust, debris or particles in the air can enter the chamber 22 of the module 10 through the front opening 23. The opportunity or particles to enter through the front opening 23 would depend on the extent that the door 48 is rotated clockwise on the pin 49 away from the closed position.

In a further preferred embodiment, the door 48 includes indicia 57 on its outer surface 55, as shown in FIG. 1. The indicia 57 can be a writing or symbol that warns of the danger that laser radiation may emanate from within the module 10, or indicates to, for example, a technician whether a connector for supplying or receiving optical energy should be installed in one of the chambers 22.

Figure 6:
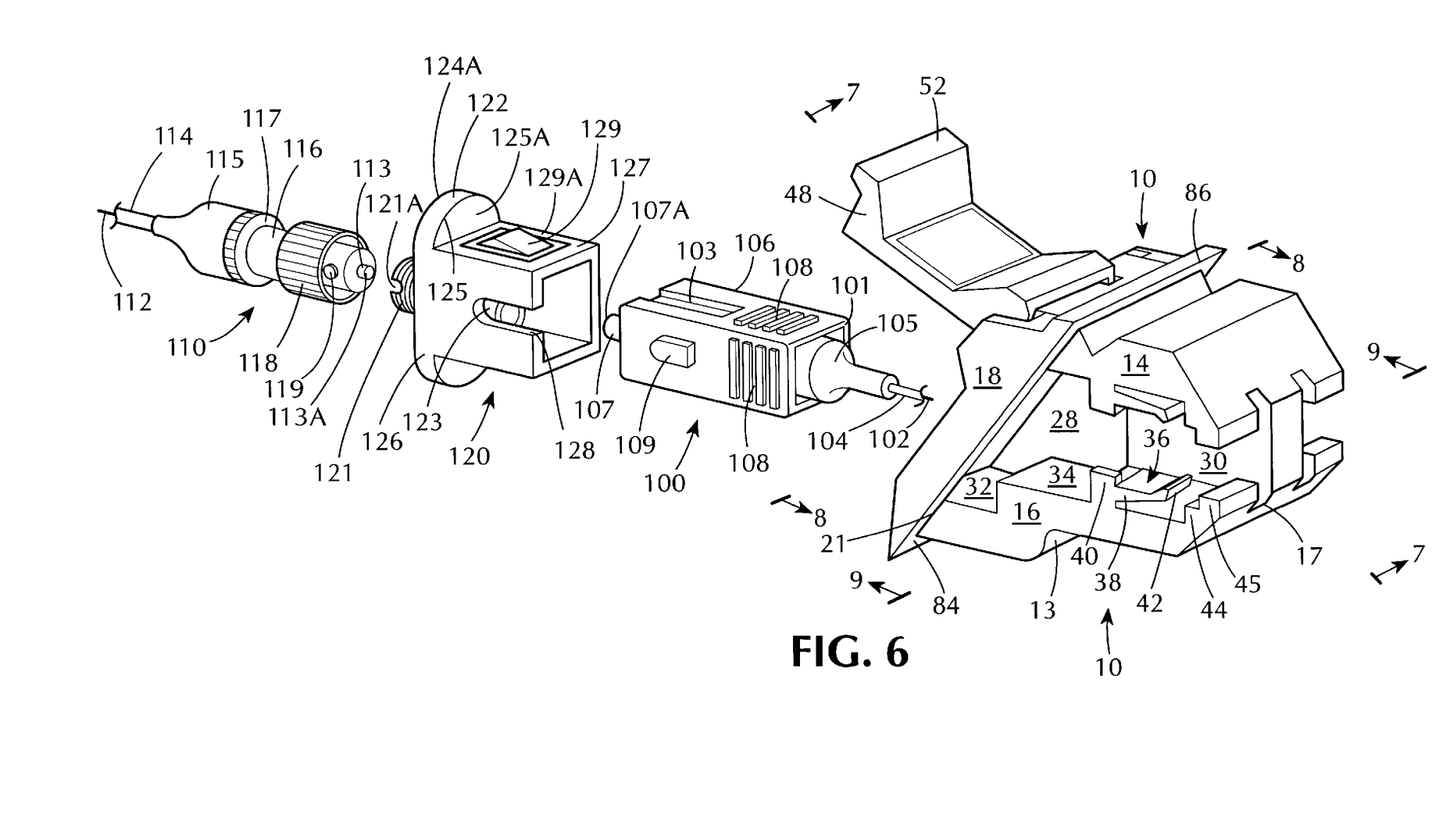
FIG. 6 is a side perspective view of SC and FC style fiber connectors and an optical adapter arranged in sequence for installation in the module of FIG. 1 for forming an optical fiber intercommunication link.

FIG. 6 shows conventional SC style and FC style fiber connectors 100 and 110 and a conventional FC-SC optical adapter 120 arranged in sequence for installation in the module 10 to provide that an optical intercommunication link can be established. The module 10, with the SC connector 100 installed therein, is preferably mounted on a panel of optical instrumentation equipment such that the chamber 22 would be exposed, if at all, to particles, dust or debris from outside the equipment only at the front opening 23. A detailed discussion concerning the mounting of the module 10 in this manner in a panel of optical instrumentation equipment using a latch 60 which is formed integrally with the bottom wall 14 of the housing 12, as shown in FIGS. 4, 5 and 6, is provided below in connection with FIGS. 8–9. For purposes of the explanation below, it is assumed that the module 10 is mounted in such equipment to provide that the front opening 23 is the only place that particles from outside the module 10 can enter into the chamber 22, such that the position of the door 48 would control whether and the extent that particles can enter through the front opening 23.

For purposes of general background and to better highlight the advantages that the inventive module 10 provides when it is mounted to a panel of optical equipment and used to establish an optical intercommunication link in conjunction with the above-identified optical fiber connection components, a brief description of the connectors 100 and 110 and the adapter 120 is provided below.

Referring to FIG. 6, the SC connector 100 includes an optical fiber 102 covered by a protective sheathing 104. A boot 105 covers the sheathing 104 and extends into a hollow, rectangular-shaped barrel 106. The barrel 106 contains a plastic capillary ferrule 107 which is coupled to the boot 105 within the barrel 106. The ferrule 107 projects from the barrel 106 at the end opposite to the boot 105 and has a male termination 107A. The fiber 102 extends through the boot 105 and the ferrule 107 and terminates as an end face at the termination 107A. The outer surfaces of the barrel 106 adjacent to the end of the barrel 106 which receives the boot 105 include parallel grooves 108. An optical adapter key 109 is disposed on one of the outer surfaces of the barrel 106. Notches 103 are defined in opposing outer surfaces of the barrel 106 which do not include the key 109. The end of the barrel 106 which receives the boot 105 terminates in an edge surface 101.

The FC connector 110 contains an optical fiber 112 covered by a protective sheathing 114. A boot 115 covers the sheathing 114, and the boot 115 and the sheathing 114 are fixed to an annular metallic alignment sleeve 116 by a ring 117. The sleeve 116 contains a metallic capillary ferrule 113 which extends in a direction opposite to the boot 115 and terminates at a male termination 113A. A ring nut 118 having an internal threading loosely encircles the sleeve 116. A key 119 is disposed on the outer surface of the sleeve 116 adjacent to the termination 113A. The fiber 112 extends through the boot 105, into the ferrule 113 in the sleeve 116 and terminates as an end face at the termination 113A.

The optical adapter 120 at one end includes a hollow, externally threaded cylindrically-shaped FC mating projection 121. The projection 121 includes a notch 121A and encircles a female termination (not shown) which can be mated with the termination 113A of the ferrule 113. The projection 121 is integral with and extends from an annular mounting ridge 122. The ridge 122 includes front and back surfaces 124 and 125, front and back edges 124 and 125A and an outer annular surface 126. A hollow rectangular-shaped SC style barrel 127 extends away from the surface 125 in a direction opposite to the projection 121. The barrel 127 includes an SC connector key notch 128 and encircles a female mating termination 123. The termination 123 is disposed in the barrel 127 to provide that the male termination 107A of the ferrule 107 can be mated with the termination 123. An optional U-shaped sleeve 129A is coupled to the opposing outer surfaces of the barrel 127 which do not include the key notch 128 and the outer surface opposing the outer surface which includes the key notch 128. The sleeve 129A includes resilient spring retention clips 129 which are disposed over the opposing outer surfaces of the barrel 127 which do not include the key notch 128.

Figure 7A:
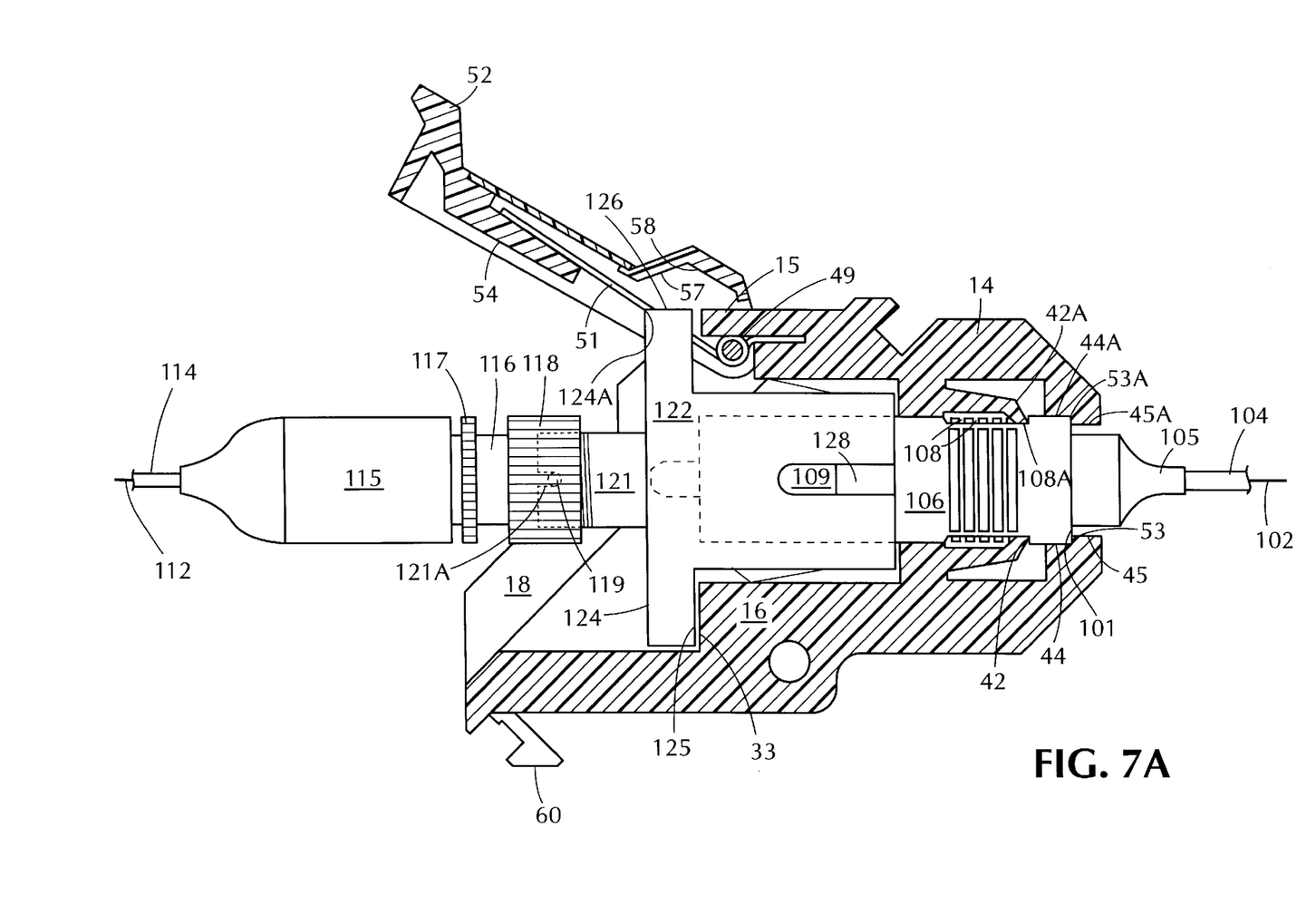
FIGS. 7A and 7B are side sectional views of FIG. 6 with the SC and FC connectors and the optical adapter installed in the module having its door not engaged and engaged with the optical adapter, respectively, viewed in the direction of the arrows 7—7 indicated in FIG. 6.
Figure 7B:
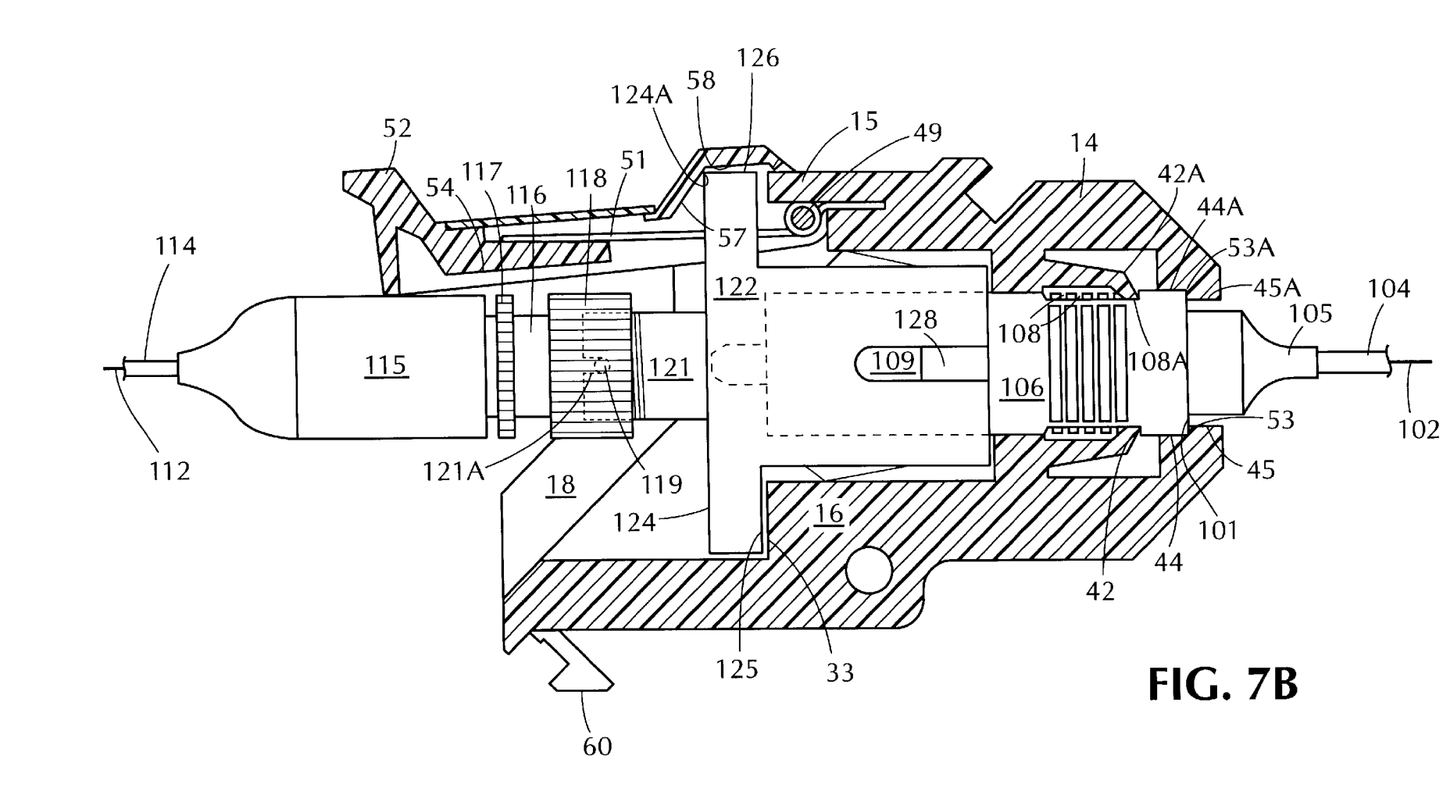

The module 10, when mounted to a panel of optical instrumentation equipment, advantageously can retain the SC connector 100, protect the end face of the fiber 102 of the connector 100 from accumulating particles, dust or debris when only the connector 100 is installed in the module 10, allow for ease of cleaning of the retained SC connector 100 and provide for mating of the retained SC connector 100 with the FC connector 110 using the adapter 120 as follows. When the door 48 is not otherwise held open by, for example, the user, and the module 10 is empty or only the connector 100 is installed in the module 10, the door 48 is in the closed position because of the operation of the spring system 50. Consequently, when a user desires to mate the SC and FC connectors 100 and 110 to each other using the adapter 120 to form an optical intercommunication link, the user would rotate the door 48 on the pin 49, advantageously using the lever 52, in the clockwise direction to an open position which provides that the SC connector 100 and the optical adapter 120, on which the connector 110 has been installed, can be inserted into the chamber 22 through the front opening 23. With the door 48 held in such open position, the SC connector 100 can be inserted through the front opening 23 of the chamber 22, sheathed portion first, and moved through the front chamber 24 towards the connecting back chamber 26. The SC connector 100 can be moved into the back chamber 26, towards the back opening 25 until the back edge surface 101 of the barrel 106 abuts against the surface 53 and is between the stops 44 and 44A, as shown in FIGS. 7A and 7B, which show sectional views of the SC and FC connectors 100 and 110 and the adapter 120 installed in the module 10. The surfaces 53 and 53A of the stops 45 and 45A, respectively, define the furthest position adjacent to the back opening 25 that the SC connector 100 can be disposed in the back chamber 26.

As the SC connector 100 moves through the back chamber 26 towards the surfaces 53 and 53A, the teeth 42 and 42A of the retaining mechanisms 36 and 36A, respectively, move along the outer surfaces of the barrel 106. The teeth 42 and 42A finally would become seated in end grooves 108A when the surface 101 abuts the surfaces 53 and 53A. The teeth 42 and 42A curl sufficiently towards each other when seated in the opposing grooves 108A to retain the SC connector 100 within the back chamber 26. The SC connector 100, as retained by the mechanisms 36 and 36A, can only be removed from the module 10 with great difficulty, for example, by depressing the clips 38 and 38A towards the respective top and bottom walls 14 and 16 to cause the teeth 42 and 42A to not engage the grooves 108A while the connector 100 is pulled, in the direction of the front opening 23, through the chamber 26 and then through the chamber 24.

After the SC connector 100 has been installed in the module 10, the user would release the lever 52 of the door 48. The door 48, no longer being held in opposition to the urging of the spring system 50, would rotate counterclockwise in the urging direction of the spring system 50 to the closed position. In the closed position, the urging that the spring system 50 applies to the door 48 maintains the chamber 22 substantially sealed at the front opening 23. The door 48 in the closed position, thus, avoids particles, dust or debris from entering the chamber 22 through the front opening 23 and accumulating on the end face of the fiber 102 of the SC connector 110 while the SC connector 110 is not mated to a fiber of another connector. The closed position of the door 48 also prevents laser radiation from possibly emanating from the fiber 102 of the retained SC connector 100, which may be connected to a laser through the back opening 25, when only the retained connector 100 is installed in the module 10, thereby avoiding harm or danger to a user.

Referring again to FIGS. 6, 7A and 7B, after the SC connector 100 has been installed in the module 10, a user can establish an optical interconnection link between the fiber 102 of the SC connector 100 and the fiber 112 of the FC connector 110 by rotating the door 48, which is assumed to have been released by the user and to have rotated counter-clockwise to and remained at the closed position, in the clockwise direction on the pin 49 to an open position. The open position selected must allow the optical adapter 120 to be inserted through the front opening 23 of the module 10, as is shown in FIG. 7A. It is assumed, for simplicity, that the FC connector 110 has been already mated to the projection 121 of the adapter 120 by inserting the key 119 into the notch 121A and then screwing the ring nut 118 on the threaded outer surface of the projection 121. With the door 48 in the suitably selected open position, the optical adapter 120 with the installed FC connector 110 is inserted, barrel 127 end first, through the front opening 23 and into the front chamber 24 towards the back opening 25 until the surface 125 of the annular ridge 122 abuts the surface 33 of the bottom wall 16, thereby preventing further movement of the adapter 120 towards the back opening 25. While the adapter 120 is moved towards the back opening 25 and before the surfaces 125 and 33 abut, the notch 128 of the adapter 120 receives the key 109 of the SC connector 100, and the end of the barrel 106 facing the front opening 23 is received in the barrel 127 of the adapter 120. Further, the male ferrule termination 107 is received in the female ferrule termination 123 of the adapter 120 to provide that the end faces of the fibers 102 and 112 are coaxial and in precise registration with each other within the adapter 120.

As the adapter 120 is moved through the chamber 24 towards the back opening 25, the user, or the outer surface 122 of the annular ridge 126 facing the underside 54 of the door 48, maintains the door 48 in the suitable open position. Further, each of the spring retention clips 129 of the sleeve 129A, which is optional, slides across the opposing surface of the housing 12 in the chamber 24 to cause slight resistance to the movement of the adapter 120 towards the back opening 25. When the adapter 120 is disposed at a position where the surfaces 125 and 33 abut, the clips 129 resiliently press against the opposing surfaces of the housing 12 to provide that the adapter 120 is held securely within the chamber 24.

After the adapter 120 has been installed in the module 10 so that the surfaces 125 and 33 abut, and assuming that the user has been holding the door 48 in the selected open position, when the user releases the hold on the door 48, the door 48 would rotate counterclockwise on the pivot 49 under the urging of the spring system 50 towards the closed position. With the adapter 120 installed in the module 10, however, the door 48 could rotate only to an open position, or locking position, which is defined by the engagement of the annular ridge 122 with the door 48 at the locking recess 56 in the underside 54 of the door 48, as shown in FIG. 7B. As the door 48 rotates counter-clockwise towards the locking position from an open position, a portion of the inclined surface 57 can bear against the edge 124A of the ridge 122 to urge the ridge 122, and as a result the adapter 120, slightly further towards the back opening 25, such that the surface 126 of the ridge 122 completely faces the surface 58 of the locking feature 56. When the surface 126 of the ridge 122 completely faces the surface 58, the inclined surface 57 would oppose the edge 124A to avoid movement of the ridge 122 towards the front opening 23. Alternatively, depending on the tolerances for manufacture of the ridge 122 and the front chamber 24 of the housing 12, the door 48 could rotate to the locking position where the surface 126 of the ridge 122 completely faces the surface 58 without contact between the inclined surface 57 and the edge 124A. The locking recess 56 of the door 48, thus, provides that the optical adapter 120 can be engaged with the door 48 and retained securely in the module 12 to avoid the possibility that the adapter 120 may fall out of or be easily removed or dislodged from the module 10 after installation.

Advantageously, before installation of the adapter 120 in the module 10, the door 48 is in the closed position which seals the chamber 22 at the front opening 23, and hence protects the end face of the fiber 102 of the connector 100. The end face of the fiber 102 of the SC connector 100, thus, would be exposed to the environment outside the module 10 at the front opening 23 only during the interval when the door 48 is opened and the adapter 120 has not been mated to the SC connector 100, which ordinarily would be a short period during standard connector mating practices. Consequently, the possibility that particles, debris or dust from the air outside the module 12 would accumulate on the end face of the fiber 102 when the retained connector 102 is not mated significantly decreases. Further, when the installed adapter 120 is removed from the module 10, which may be performed by further clockwise rotation of the door 48 on the pin 49 to a selected open position where the door 48 is disengaged from the adapter 120, such as shown in FIG. 7A, the door 48 would return to the closed position after the user releases the door 48 and the door 48 would remain in the closed position to maintain the chamber 22 substantially sealed at the front opening 23. Thus, when the module 10 only contains the retained connector 100, the door 48 is normally in the closed position and serves as a cover on the module 10 at the front opening 23 that protects the exposed end face of the optical fiber 102 of the connector 100.

Further, the door 48 can be easily rotated to an open position when the module 10 contains only the retained connector 100 to allow for cleaning of the end face of the fiber 102 of the connector 100 in the back chamber 26. For example, a swab can be easily inserted into the front chamber 24, which is of sufficiently large size to receive the adapter 120 and is presently unoccupied, and wiped on the end face of fiber 102 which is in the chamber 24.

Further, after installation of the adapter 120 in the module 10, the adapter 120 can be easily removed to allow for cleaning of the fiber 102 of the retained connector 100. For example, when the module 10 is mounted to the front panel of optical instrumentation equipment such that access to the connector 100 is available only through the front opening 23, the end face of fiber 102 can be cleaned simply by opening the door 48 without removing the module 10 from a panel of the optical equipment or removing the retained connector from the module, as is done in the art.

Figure 8:
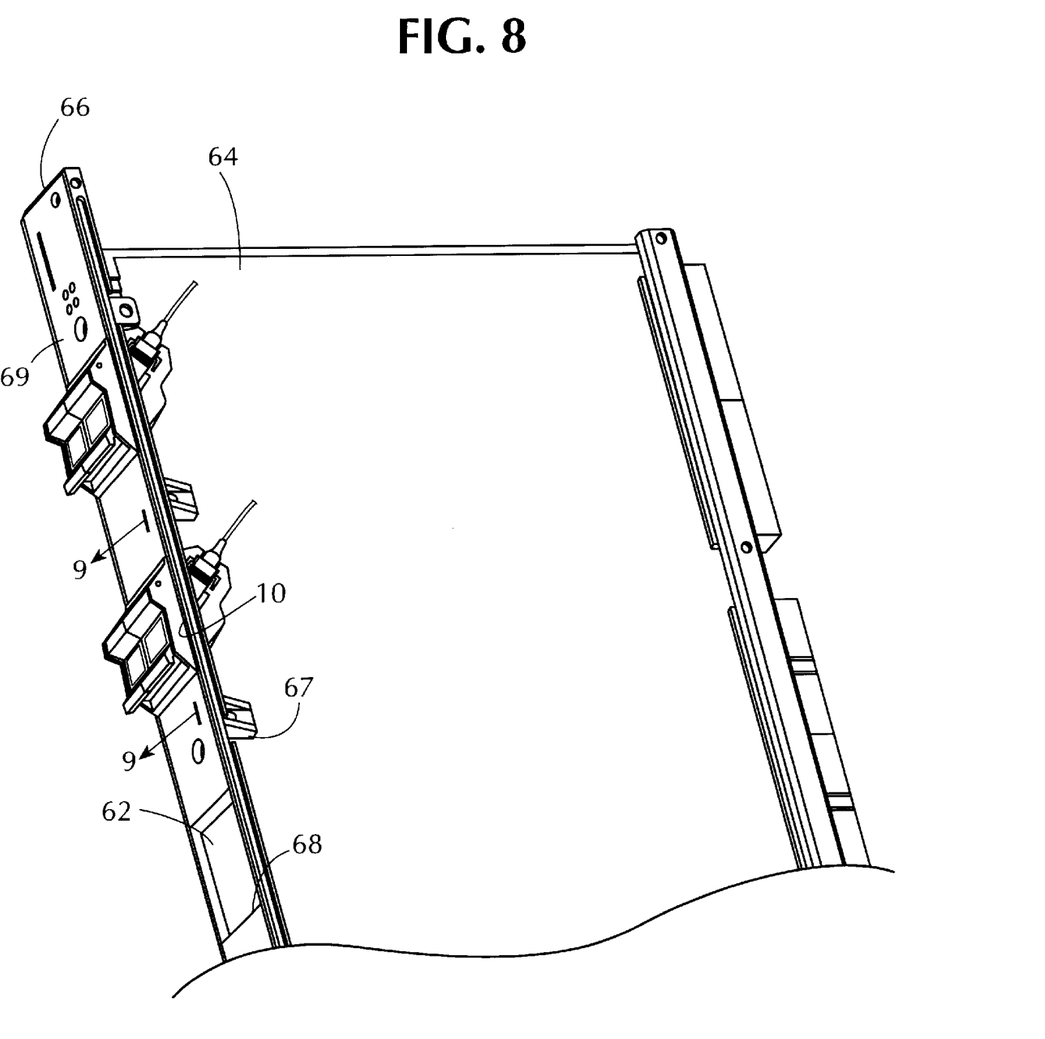
FIG. 8 is a perspective view of modules of the present invention in which an SC connector has been retained and which have been latched into cutouts in a panel of optical instrumentation equipment.
Figure 9:
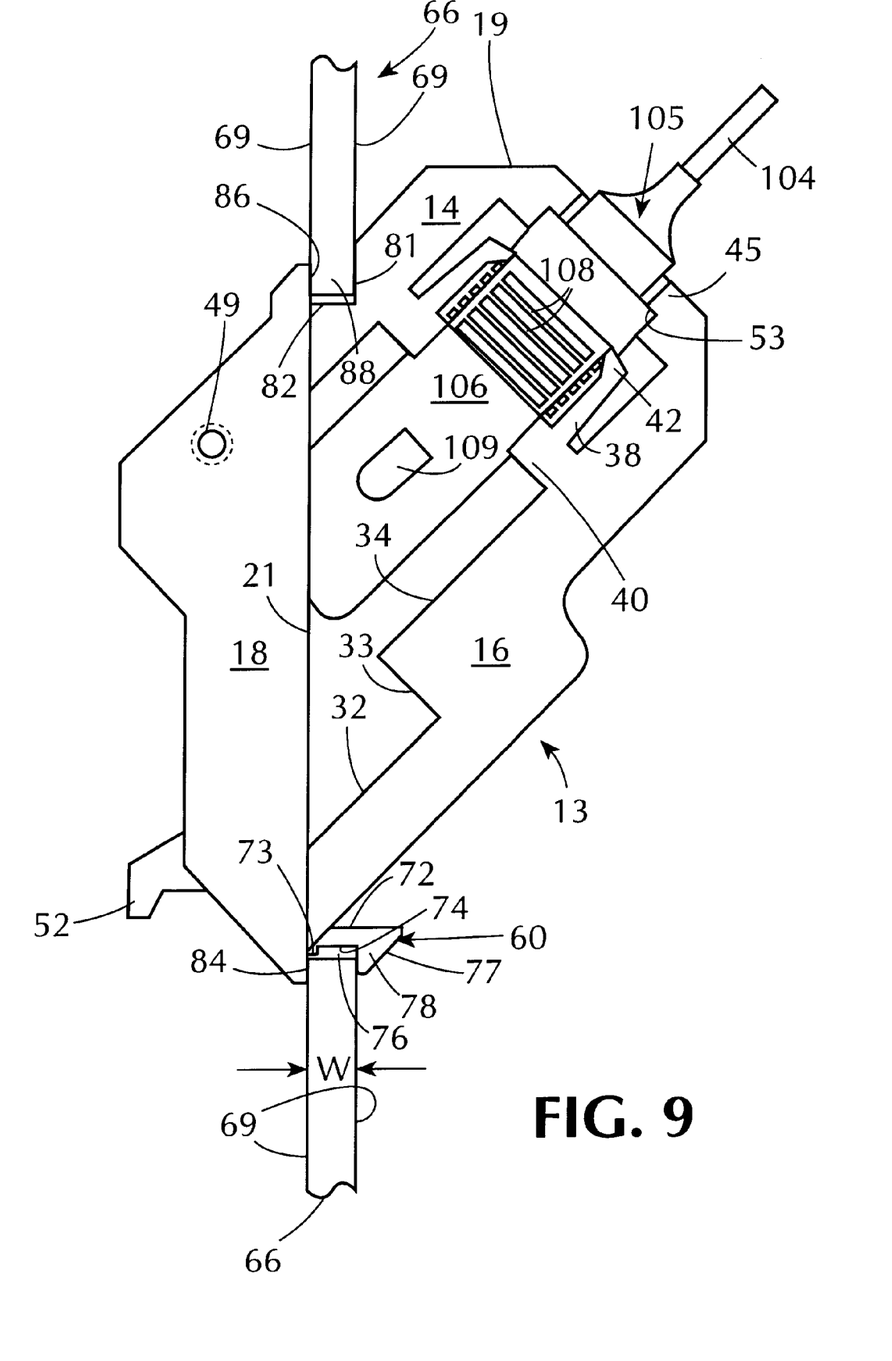
FIG. 9 is a side sectional view of one of the modules of the present invention latched into one of the cutouts of the panel of the equipment of FIG. 8 viewed in the direction of the arrows 8—8 indicated in FIG. 8.

FIGS. 8 and 9 illustrate the features of the module 10 that allow for ease of installation of the module 10 in a panel of optical equipment such that any particles in the outside environment can enter the chamber 22 only through the front opening 23, which can be sealed by the door 48. FIG. 8 shows an exemplary front panel 66 of optical instrumentation equipment 64 in which several modules 10 have been mounted, and FIG. 9 shows a sectional view of the module 10 mounted in a cutout 62 of the panel 66 of the equipment 64.

Referring to FIG. 9, the bottom wall 16 of the module 10 includes an outer surface 13 from which the locking flange 60, which is integral with the housing 12, projects. The locking flange 60 is adjacent to the front opening 23 and has flat upper and underside surfaces 72 and 74, respectively. Each of the surfaces 72 and 74 extends away from the bottom wall surface 13 and is perpendicular to lower lip surface 84 of the surface 13. The surfaces 21 and 84 are in the same plane and illustrated in greater detail in FIGS. 5 and 6. The surface 74 is disposed between a step 73 and a triangular-shaped hooking tab 78. The step 73 is adjacent to the surface 84 and projects further away from the surface 72 than the surface 74. The triangular tab 78 projects further away from the surface 72 than the step 73 and terminates in a surface 77 which is at an acute angle with respect to the surface 72. The step 72, the tab 78, the surface 84 and the surface 74, in combination, define a slot 76. The width, w, of the slot 76, which is the distance between the lip surface 84 of the bottom wall 16 and the facing surface of the tab 78, is, preferably, substantially equal to the distance between opposing outer wall surfaces 69 of the panel 66 of the optical equipment 64.

Further referring to FIG. 9, the top wall 14 includes an outer surface 19 comprising a flat recess surface 82 which is parallel to the surface 74 of the latch 60. The surface 82 is bounded by a side surface 81, which is also a part of the outer surface 19, and an upper lip surface 86 of the top wall 14. The surfaces 86 and 21 are in the same plane and illustrated in detail in FIGS. 5 and 6. Each of the surfaces 81 and 88 is perpendicular to the recess surface 82, and the surfaces 81, 82 and 86, in combination, define a slot 88 having a width w.

Referring to FIGS. 8 and 9, the module 10 would be installed in one of the cutouts 62 in the panel 66 preferably after the SC connector 100 has been installed within the module 10. The combination of the flange 60 with the slots 76 and 88 provides that the module 10 can be easily mounted into the cutout 62 in the panel 66 of the optical equipment as follows. The module 10 with the installed connector 100 would be inserted, back opening 25 first, into the cutout 62 so that the slot 88 first receives upper edge surface 67 of the cutout 62. Then, the remainder of the housing 12 of the module 10 would be moved further into the cutout 62. The angled surface 77 of the latch 60 allows the latch 60 to slide easily over lower edge 68 of the cutout 62, such that the tab 78 of the latch 60 snaps or locks into place over the edge surface 68. The edge surfaces 66 and 68 become secured in the slots 76 and 88 because outer surfaces 69 of the panel 66 are pinched between the surfaces 81 and 86 and the lip surface 88 and the facing surface of the tab 78, respectively.

Although preferred embodiments of the present invention have been described and illustrated, it will be apparent to those skilled in the art that various modifications may be made without departing from the principles of the invention.

What is claimed is:

1. An optical fiber connector module comprising:
a housing having a front body portion connected to a back body portion, wherein the front body portion and the back body portion, in combination, define a chamber which extends from the front body portion to the back body portion, wherein the front body portion further defines a front opening of the chamber through which first and second fiber connectors and an optical adapter can be inserted and wherein the back body portion defines a back opening of the chamber and includes fiber connector retaining means disposed adjacent to the back opening and for retaining the first fiber connector in the chamber; and
a cover coupled to the front body portion of the housing, wherein the cover can be disposed in a closed position and at least one open position, wherein in the closed position the cover substantially seals the front opening of the housing and wherein in the at least one open position the adapter can be inserted into the chamber through the front opening.

2. The module of claim 1, wherein the housing is formed by injection molding.

3. The module of claim 2, wherein the retaining means includes at least one clip which extends from the back body portion into the chamber.

4. The module of claim 1, wherein the back and front body portions are integral and the retaining means is a separate structure coupled to the back body portion.

5. The module of claim 1, wherein the cover comprises a door rotatably coupled to the front body portion and rotatable to the closed position and to the at least one open position.

6. The module of claim 5, wherein the door includes an urging means that urges the door to rotate towards the closed position from any of the least one open positions.

7. The module of claim 6, wherein the urging means includes a spring coil and a pivoting pin coupled to the front body portion.

8. The module of claim 5, wherein the door includes an underside surface which faces the front opening when the door is in the closed position, wherein the underside surface includes a locking means which can be engaged with the optical adapter to retain the adapter securely in the module when the door is in one of the least one open positions, the first fiber connector has been inserted through the front opening and retained by the retaining means and the adapter has been inserted through the front opening and mated with the first fiber connector in the chamber.

9. The module of claim 5, wherein when the door is in one of the at least one open positions, the second fiber connector can be installed on the end of the adapter facing the front opening when the adapter has been inserted through the front opening and the first fiber connector has been inserted through the front opening and retained by the retaining means.

10. The module of claim 5, wherein when the door is in one of the at least one open positions and only the first fiber connector has been inserted through the front opening and retained by the retaining means, the portion of the chamber between the front opening and the first fiber connector is of sufficient size to allow for cleaning of the end face of the fiber of the first fiber connector facing the front opening using a swab.

11. The module of claim 10, wherein each of the first and the second fiber connectors is selected from a group of SC, FC, PC and ST style connectors and the optical adapter is selected from connector styles that can provide for mating between the first and second connectors using the adapter.

12. The module of claim 1 further comprising a locking flange for latching the housing to a panel of optical instrumentation equipment.

13. An optical fiber connector module comprising:
a housing having a top wall opposing a bottom wall and first and second side walls connecting respective ends of the top and bottom walls to each other, wherein the top and bottom walls and the first and second sides walls define a chamber having a front opening and a back opening,
the housing further including a fiber connector retaining means disposed adjacent to the back opening and for retaining a fiber connector in the chamber, wherein the front opening is sized to receive an optical fiber adapter for insertion into the chamber, a first fiber connector for insertion into the chamber and retention by the retaining means and a second fiber connector which can be installed on the adapter such that the first and second fiber connectors are mated within the chamber in precise registration; and a rotatable door having one end pivotally coupled to the side walls at the front opening of the housing and rotatable to a closed position and to at least one open position, wherein in the closed position the door substantially seals the front opening of the chamber and wherein in the at least one open position the adapter can be inserted through the front opening.

14. The module of claim 13, wherein the retaining means includes a resilient clip disposed adjacent to the back opening and projecting into the chamber from at least one of the top and bottom walls.

15. The module of claim 13, wherein the door includes an urging means that urges the door to rotate towards the closed position from any of the at least one open positions.

16. The module of claim 15, wherein the urging means includes a pivoting pin extending between and coupled to the first and second side walls and a spring coil wound at least once around the pin and fixed to the door.

17. The module of claim 13, wherein the door includes an underside surface which faces the front opening when the door is in the closed position, wherein the underside surface includes a locking means which can be engaged with the optical adapter to retain the adapter securely in the module when the door is in one of the least one open positions, the first fiber connector has been inserted through the front opening and retained by the retaining means, the adapter has been inserted through the front opening and the first fiber connector has been installed on the adapter in the chamber.

18. The module of claim 13, wherein the door further includes a lever at the end opposing the end at the front opening of the housing.

19. The module of claim 13 further comprising a locking flange for latching the housing to a panel of optical instrumentation equipment.

20. The module of claim 13, wherein each of the first and the second fiber connectors is selected from a group of SC, FC, PC and ST style connectors and the optical adapter is selected to have terminations that would provide for mating between the first and second connectors using the adapter.

21. The module of claim 13, wherein the housing is formed by injection molding.

22. An optical fiber connector module comprising:
a housing comprising:
    a top wall opposing a bottom wall;
    first and second side walls connecting respective ends of the top and bottom walls to each other;
    a center dividing wall disposed between the side walls and extending between the top and bottom walls, wherein the top and bottom walls, the first and second side walls and the center wall define first and second chambers, wherein the first and second chambers are symmetrical about the center wall;
wherein, for each of the first and second chambers, the top wall, the bottom wall, the center wall and the side wall define a front opening and a back opening, a fiber connector retaining means is disposed adjacent to the back opening and projects from the top wall and the bottom wall, and wherein the front opening is sized to receive an optical fiber adapter for insertion into the chamber, a first fiber connector for insertion into the chamber and retention by the retaining means and a second fiber connector which can be installed on the adapter such that the first and second fiber connectors are mated in precise registration within the chamber; and
a locking flange extending from the bottom wall for latching the housing to a panel of optical instrumentation equipment; and
a rotatable door pivotally mounted to the top wall at the first and second front openings of the housing, wherein each of the doors is rotatable to a closed position and to at least one open position, wherein in the closed position the door substantially seals the front opening and wherein in the at least one open position the first fiber connector and the adapter can be inserted through the front opening, and wherein the door includes an urging means that urges the door to rotate towards the closed position from any of the least one open positions.

23. An optical fiber connector module comprising:
a housing having a front body portion connected to a back body portion, wherein the front body portion and the back body portion, in combination, define a chamber which extends from the front body portion to the back body portion, wherein the front body portion further defines a front opening of the chamber through which first and second fiber connectors can be inserted and wherein the back body portion defines a back opening of the chamber and includes fiber connector retaining means disposed adjacent to the back opening and for retaining the first fiber connector in the chamber; and
a cover coupled to the front body portion of the housing, wherein the cover can be disposed in a closed position and at least one open position, wherein in the closed position the cover substantially seals the front opening of the housing and wherein in the at least one open position the second fiber connector can be inserted through the front opening and into the chamber and mated within the chamber in precise registration with the first fiber connector which has been inserted in the front opening and retained by the retaining means.

* * * * *